(12) United States Patent
Hussain et al.

(10) Patent No.: US 6,948,379 B2
(45) Date of Patent: Sep. 27, 2005

(54) MASS FLOWMETER

(75) Inventors: Yousif A. Hussain, Weston Fevell (GB); Chris N. Rolph, Hartwell (GB); Neil Harrison, Duston (GB); Vincent Cook, Northants (GB); Lawrence Davies, Corby Northants (GB)

(73) Assignee: Krohne AG (CH)

( * ) Notice: Subject to any disclaimer, the term of this patent is extended or adjusted under 35 U.S.C. 154(b) by 212 days.

(21) Appl. No.: 10/379,782

(22) Filed: Mar. 5, 2003

(65) Prior Publication Data

US 2004/0173032 A1 Sep. 9, 2004

(30) Foreign Application Priority Data

Mar. 6, 2002 (DE) ......................................... 102 09 689

(51) Int. Cl.[7] ............................................... G01F 1/84
(52) U.S. Cl. ................................................ 73/861.357
(58) Field of Search ........................ 73/861.18, 861.19, 73/861.28, 861.354, 861.351, 861.355, 861.357

(56) References Cited

U.S. PATENT DOCUMENTS

| | | | | | |
|---|---|---|---|---|---|
| 4,823,614 | A | * | 4/1989 | Dahlin ................... | 73/861.357 |
| 5,355,737 | A | * | 10/1994 | Lew et al. .............. | 73/861.355 |
| 5,365,794 | A | * | 11/1994 | Hussain et al. ......... | 73/861.357 |
| 5,381,697 | A | * | 1/1995 | van der Pol ........... | 73/861.356 |
| 5,398,554 | A | * | 3/1995 | Ogawa et al. .......... | 73/861.357 |
| 5,531,126 | A | * | 7/1996 | Drahm ................... | 73/861.357 |
| 5,796,010 | A | * | 8/1998 | Kishiro et al. ......... | 73/861.357 |
| 5,796,011 | A | * | 8/1998 | Keita et al. ............. | 73/861.357 |
| 5,945,609 | A | * | 8/1999 | Kashimura et al. ..... | 73/861.357 |
| 6,360,614 | B1 | * | 3/2002 | Drahm et al. ........... | 73/861.357 |
| 6,397,685 | B1 | * | 6/2002 | Cook et al. ............. | 73/861.357 |
| 6,401,548 | B1 | * | 6/2002 | Drahm et al. ........... | 73/861.357 |
| 6,543,281 | B2 | * | 4/2003 | Pelletier et al. ........ | 73/861.357 |
| 6,647,807 | B2 | * | 11/2003 | Drahm et al. ........... | 73/861.357 |
| 6,688,176 | B2 | * | 2/2004 | Storm et al. ........... | 73/861.355 |
| 2003/0055580 | A1 | * | 3/2003 | Normen .................. | 73/861.357 |

* cited by examiner

*Primary Examiner*—Edward Lefkowitz
*Assistant Examiner*—T Miller
(74) *Attorney, Agent, or Firm*—Cesari and McKenna, LLP

(57) ABSTRACT

A Coriolis mass flowmeter that incorporates a straight Coriolis measuring tube, two straight connecting pipes, at least one oscillator stimulating the tube, a measuring sensor associated with the tube and a compensating cylinder, where the tube is positioned within the cylinder, the two end sections of the cylinder are solidly connected to the respective end sections of the tube, the tube transitions with either end section into a connecting pipe, the connecting pipes extending outside the compensating cylinder, and by means of mounting flanges provided on the external ends of the connecting pipes, the mass flowmeter can be installed in a pipeline system. Each connecting pipe meets the requirements of the formula $$\frac{Mf^2}{ei/l^3} > 5.5$$

where M is the mass of the cylinder, f is the natural frequency of the water-filled tube, e is the modulus of elasticity of the connecting pipes, i is the geometric moment of inertia of the connecting pipes and l is the length of the connecting pipes.

6 Claims, 1 Drawing Sheet

MASS FLOWMETER

BACKGROUND OF THE INVENTION

1. Field of the Invention

This invention relates to a mass flowmeter that operates by the Coriolis principle and incorporates an essentially straight Coriolis measuring tube through which flows a process medium, two essentially straight connecting pipes conducting said flowing medium, at least one oscillator associated with and stimulating the Coriolis measuring tube, at least one measuring sensor associated with the Coriolis measuring tube for detecting Coriolis forces and/or oscillations generated by Coriolis forces, and a compensating cylinder, wherein said Coriolis measuring tube is housed within said compensating cylinder, each of the two ends of the compensating cylinder connects in mechanically fixed fashion to an end section of the Coriolis measuring tube, each of the two end sections of the Coriolis measuring tube transitions into a connecting pipe, said connecting pipes are positioned outside the compensating cylinder, and by way of mounting adapters provided at the external ends of the connecting pipes, the mass flowmeter can be installed in a pipeline system. An example of this type of mass flowmeter has been described in the technical publication "atp—Automatisierungstechnische Praxis" (Applied Automation Technology) No. 40 (1998), pp. 24-29.

As stated above, the mass flowmeter according to this invention incorporates at least one oscillator "associated with" the Coriolis measuring tube, and at least one measuring sensor likewise "associated with" the Coriolis measuring tube. The oscillator or at least part of the oscillator, and the measuring sensor, or at least part of the measuring sensor are usually connected to the Coriolis measuring tube. However, because that is not an absolute requirement, the term "associated with" has been chosen in lieu of "connected".

In the case of mass flowmeters employing the Coriolis principle, a fundamental differentiation is made between configurations employing an at least essentially linear i.e. straight, Coriolis measuring tube, and those in which the Coriolis measuring tube is looped. Among these mass flowmeters one also distinguishes between designs employing only one Coriolis measuring tube and those equipped with two Coriolis measuring tubes, where two Coriolis measuring tubes are used. These may be positioned either in tandem or side-by-side for a straight-line or parallel flow.

In recent times, there has been an increasing preference for mass flowmeters employing only one, essentially straight Coriolis measuring tube. Coriolis-type mass flowmeters with only one straight Coriolis measuring tube offer considerable advantages over mass flowmeters with two straight Coriolis measuring tubes or one looped Coriolis measuring tube: Their main advantage over mass flowmeters using two straight Coriolis measuring tubes lies in the fact that they do not require any of the flow dividers and flow recombiners or junctions that are needed for dual Coriolis measuring tubes. Compared to mass flowmeters with one looped Coriolis measuring tube or even two looped Coriolis measuring tubes, their primary advantage is seen in the fact that a straight Coriolis measuring tube is easier to produce than a looped Coriolis measuring tube, there is less pressure drop in a straight Coriolis measuring tube than in a looped Coriolis measuring tube, and a straight Coriolis measuring tube can be cleaned more easily than a looped Coriolis measuring tube.

On the other hand, Coriolis-type mass flowmeters with a straight Coriolis measuring tube have one intrinsic drawback insofar as, in mass flowmeters employing the Coriolis principle, it is necessary for at least one oscillator to cause the Coriolis measuring tube or tubes to oscillate and that, ultimately, the Coriolis measuring tube or tubes oscillate(s) as a function of the Coriolis forces or resulting Coriolis oscillations while a process medium flows through the Coriolis measuring tube or tubes. In the case of mass flowmeters using two straight Coriolis measuring tubes or a looped Coriolis measuring tube or two looped Coriolis measuring tubes, these Coriolis measuring tubes or the oscillating sections of the looped Coriolis tubes are identical in design, and they are positioned and stimulated in such fashion that they oscillate against each other. As a result, the overall oscillating system has no oscillatory effect on its surroundings. The center of mass of that system remains stationary, which compensates for any impinging forces. It follows that this type of mass flowmeter does not transfer any oscillations into the pipeline system in which it is installed and, consequently, there are no retroreflected oscillations from the pipeline that would compromise the measuring accuracy.

Evidently, Coriolis-type mass flowmeters equipped with only one straight Coriolis measuring tube do not offer this functional feature of mutually counter-oscillating Coriolis measuring tubes or sections thereof Therefore, in a mass flowmeter with only a single Coriolis measuring tube, the center of mass does not remain stationary and there is no compensation for impinging forces. As a result, the oscillations are transferred into the pipeline system in which the mass flowmeter is installed from where they can be reflected back.

2. Description of the Prior Art

As a means to at least reduce the above-mentioned problem inherent in Coriolis-type mass flowmeters employing a single Coriolis measuring tube, the mass flowmeter first above described and on which this invention is based can be equipped with a compensating cylinder. Such a provision can significantly lessen the forces that would otherwise bear on the mounting hardware by means of which the mass flowmeter is installed in the pipeline system.

As another possible improvement in a mass flowmeter that incorporates a single straight Coriolis measuring tube in conjunction with a compensating cylinder, DE 197 10 806 A1 proposes to symmetrically mount a symmetrically configured equalizing system on the compensating cylinder. That equalizing system would be so designed as to minimize, preferably close to zero, the oscillating amplitude of the compensating cylinder.

DE 198 40 782 on its part proposes an equalization of both the excitation oscillations and the Coriolis oscillations of the Coriolis measuring tube within the compensating cylinder. Accordingly, neither the stimulation i.e. excitation oscillations nor the Coriolis oscillations would affect the compensating cylinder. In other words, neither the excitation oscillations nor the Coriolis oscillations would cause the compensating cylinder to oscillate, leaving the compensating cylinder in an unaffected, quiescent state. This means that it is possible to further improve a Coriolis-type mass flowmeter employing only one essentially straight Coriolis measuring tube by keeping the center of mass of the overall assembly of the compensating-cylinder components in a stationary state, or in fact by keeping the center of mass of the overall assembly composed of the Coriolis measuring tube, the oscillator or oscillators and the measuring sensor or sensors in a stationary state. If there are other components contained within the compensating cylinder, it is of course necessary to include them in this equation.

Moreover, EP 0 759 542 A1 and EP 0 831 306 A1 describe mass flowmeters in which the compensating cylinder is provided with weights designed to match its intrinsic natural frequency with the resonant frequency of the Coriolis measuring tube. U.S. Pat. No. 5,796,010 on its part describes an additional mass that is mounted on the compensating cylinder. That mass is intended to reduce the resonant frequency of the mounting hardware for the Coriolis measuring tube, which includes the compensating cylinder. Two alternative methods are offered for mounting the additional mass, one providing for it to be placed in the center of the compensating cylinder while the other involves the attachment of additional elements of mass at the ends of the compensating cylinder.

Finally, DE 199 08 072 A1 describes a mass flowmeter employing the Coriolis principle and incorporating one single, straight Coriolis measuring tube, where for the mass equalization of the excitation oscillation, a first balancing mass is provided and connected to the compensating cylinder along the central plane extending in a perpendicular direction relative to the longitudinal axis of the latter, while for the mass equalization of the Coriolis oscillation, a second balancing mass and a third balancing mass are provided in the form of end sections of the compensating cylinder. This approach is intended to at least largely equalize the mass of the oscillation-capable system consisting of the Coriolis measuring tube and the compensating cylinder with regard to both the excitation oscillations of the Coriolis measuring tube and the Coriolis oscillations of the Coriolis measuring tube.

SUMMARY OF THE INVENTION

It is the objective of this invention to introduce a mass flowmeter that operates by the Coriolis principle and incorporates one single straight Coriolis measuring tube, which offers a simple alternative for largely preventing the transfer of oscillations into the pipeline system in which the mass flowmeter is installed.

With reference to the mass flowmeter first above described, the mass flowmeter according to the invention excels by the fact that for each connecting pipe it meets the requirements of the formula $$\frac{Mf^2}{ei/l^3} > 5.5$$

where M is the mass of the compensating cylinder, f is the natural frequency of the water-filled Coriolis measuring tube, e is the modulus of elasticity of the connecting pipes, i is the geometric moment of inertia of the connecting pipes and l is the length of the connecting pipes. The mass is expressed in kg, the natural frequency in Hz, the modulus of elasticity in $N/m^2$, the geometric moment of inertia in $m^4$ and the length in m.

The invention provides for the compensating cylinder to be constructed as heavily as possible, whereas the connection of the unit that consists of the compensating cylinder and the Coriolis measuring tube along with the oscillator(s) and measuring sensor(s) via the connecting pipes to the pipeline system accepting the mass flowmeter is made in a rather "soft" fashion. A very heavy compensating cylinder design is generally tantamount to a very rigid compensating cylinder, so that by virtue of the fact that the compensating cylinder is attached to the ends of the Coriolis measuring tube, only the Coriolis measuring tube proper will be subject to excitation and Coriolis oscillations; the connecting pipes will "feel" virtually none of these oscillations.

However, the "soft" connecting pipes cause an oscillation of the assembly composed of the Coriolis measuring tube and the compensating cylinder along with the oscillator(s) and the measuring sensor(s) relative to the pipeline system in which the mass flowmeter is installed. In that case, the intrinsic frequency of the assembly consisting of the Coriolis measuring tube, the compensating cylinder, the oscillator(s) and the measuring sensor(s) will be substantially lower than that of the Coriolis measuring tube itself. This significantly reduces the coupling effect between the assembly composed of the Coriolis measuring tube, the compensating cylinder, the oscillator(s) and the measuring sensor(s) relative to its surroundings, meaning in particular the pipeline system in which the mass flowmeter is installed.

According to a preferred embodiment of the invention, a further reduction of the oscillations transferred from the mass flowmeter into its surroundings and especially into the pipeline system in which the mass flowmeter is installed, is obtained in that both connecting pipes meet the requirements not only of the preceding formula but also those of the following formula $$\frac{EI/L^3}{ei/l^3} > 12$$

where E is the modulus of elasticity of the compensating cylinder, I is the geometric moment of inertia of the compensating cylinder and L is the length of the compensating cylinder.

The formulas shown above provide an optimal design for a Coriolis-type mass flowmeter with one single straight Coriolis measuring tube especially when, apart from its connections with the ends of the Coriolis measuring tube, the compensating cylinder is not connected to any other component of the mass flowmeter, and when the oscillations of the Coriolis measuring tube are flexural vibrations i.e. oscillations along one plane When that fact is given, any oscillatory coupling between the assembly composed of the Coriolis measuring tube, the compensating cylinder, the oscillator(s) and the measuring sensor(s) and its surroundings will be rather minimal.

Now if, according to a further, preferred embodiment of the invention, a housing is provided that encloses the Coriolis measuring tube, the compensating cylinder and the connecting pipes and is physically attached to the outer ends of the connecting pipes, that housing does not have to be particularly massive in order to absorb the oscillations. Instead, a simple enclosure that merely serves for mechanical protection will suffice, thus allowing for a significant reduction of the overall weight of the mass flowmeter.

It is entirely possible to use connecting pipes that differ from the Coriolis measuring tube in terms of both the material from which they are made and of their dimensions. In a preferred embodiment of the invention, however, the inner diameter, the wall thickness and the material of the Coriolis measuring tube match the inner diameter, the wall thickness and the material of the connecting pipes. It follows that the Coriolis measuring tube and the connecting pipes can be produced as one continuous tubular unit, in which the "Coriolis measuring tube" section and the "connecting tube" sections are defined and separated only by virtue of the fact that the compensating cylinder is attached to the continuous tubular unit. In other words, the Coriolis measuring tube constitutes the section of the continuous tube that is positioned within the compensating cylinder and is subjected to the excitation and Coriolis oscillations while the connecting pipes constitute the sections of the continuous tubular unit that extend outside the compensating cylinder and connect to the pipe system in which the mass flowmeter is installed.

There are different ways in which the mass flowmeter can be installed in the pipeline system. However, a preferred implementation of the invention provides for the mounting hardware on the outer ends of the connecting pipes by means of which the mass flowmeter is installed in the pipeline system to be in the form of flanges, which flanges permit easy installation of the mass flowmeter in the pipeline system.

BRIEF DESCRIPTION OF THE DRAWINGS

The mass flowmeter according to the invention can be configured and further enhanced in a variety of ways. One preferred embodiment of the invention is described in detail as follows, with reference to the attached drawings, in which.

DETAILED DESCRIPTION OF AN ILLUSTRATIVE EMBODIMENT

Figure 1:
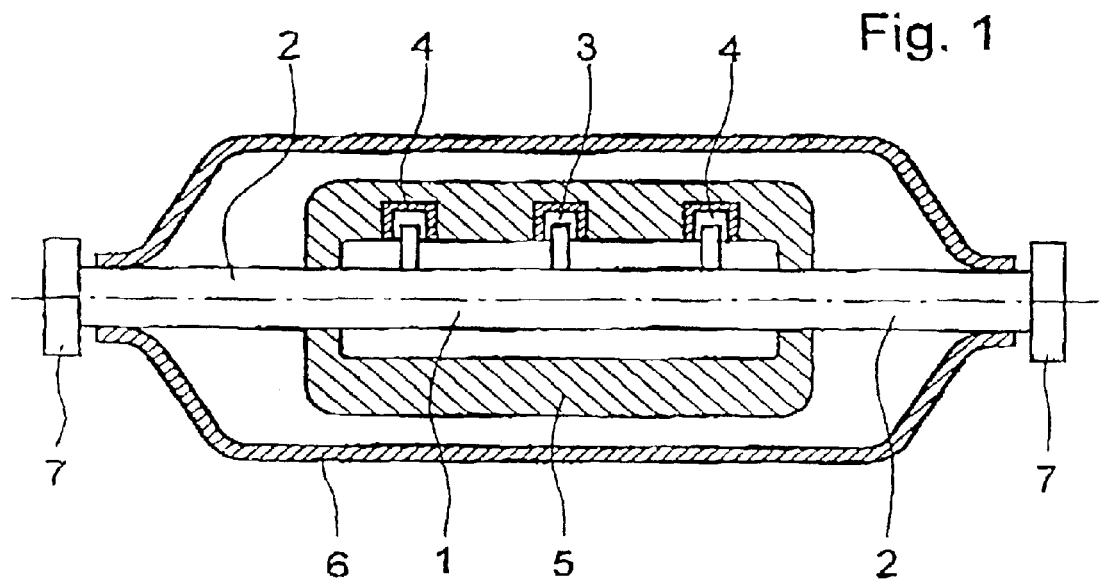
FIG. 1 is a cross-sectional view of a mass flowmeter according to a preferred embodiment of the invention.

FIG. 1 depicts a mass flowmeter that operates by the Coriolis principle and incorporates a straight Coriolis measuring tube 1 through which flows a process medium, two straight connecting pipes 2 conducting the flowing medium, an oscillator 3 associated with the Coriolis measuring tube I and stimulating the Coriolis measuring tube 1 with an excitation frequency corresponding to its naturalfrequency when in the medium-carrying state, two measuring sensors 4 associated with the Coriolis measuring tube 1 and collecting the Coriolis oscillations, and a compensating cylinder 5. The oscillator 3 and the measuring sensors 4 are attached to the compensating cylinder 5 from where they interact with the Coriolis measuring tube 1. Each of the two ends of the compensating cylinder 5 is physically mounted in solid fashion, i.e. welded, on a respective end section of the Coriolis measuring tube 1.

As can be seen in FIG. 1, the Coriolis measuring tube 1 and the connecting pipes 2 are constituted by a single continuous tube, meaning that at the points at which the compensating cylinder 5 is attached to the Coriolis measuring tube 1, the Coriolis measuring tube 1 transitions "seamlessly" into the connecting pipes 2. In this fashion, the connecting pipes 2 are located entirely outside the compensating cylinder 5. All this, i.e. the Coriolis measuring tube 1, the compensating cylinder 5 with the oscillator 3 and the measuring sensors 4 and the connecting pipes 2, is enclosed by a housing 6 that is physically attached to the outer end sections of the connecting pipes 2. Two flanges 7 provided at the outside ends of the connecting pipes 2 external to the housing 6 serve for mounting the mass flowmeter.

The Coriolis measuring tube I consists of titanium and, together with the connecting pipes 2, the assembly extends over a length of 714 mm (281 inches). The outer diameter of the Coriolis measuring tube 1 and that of the connecting pipes 2 is 25.4 mm (1 inch) with a wall thickness of 0.64 mm (¼ inch). The compensating cylinder 5 is made of stainless steel, its length is 438 mm (172.4 inches) and it is mounted on the Coriolis measuring tube 1 in such fashion that two connecting pipes 2 extend from it over identical lengths. Correspondingly, each connecting pipe 2 is 138 mm (54.3 inches) long. In addition, the mass flowmeter according to the first preferred embodiment of the invention is so dimensioned that it corresponds to the formula $$\frac{Mf^2}{ei/l^3} > 5.5$$

where M is the mass of the compensation cylinders, f is the natural frequency of the water-filled Coriolis measuring tube, e is the modulus of elasticity of the connecting pipes, i is the geometric moment of inertia of the connecting pipes and l is the length of the connecting pipes. Also met are the requirements of the formula $$\frac{EI/L^3}{ei/l^3} > 12$$

where E is the modulus of elasticity of the compensating cylinder (5), 1 is the geometric moment of inertia of the compensating cylinder (5) and L is the length of the compensating cylinder (5).

This ensures that the assembly, composed of the Coriolis measuring tube 1 and the compensating cylinder 5 along with the oscillator 3 and the measuring sensor 4, is "soft"-coupled via the connecting pipes 2 to the pipeline system in which the mass flow-meter is installed. Due to the way in which the compensating cylinder 5 is attached to the ends of the Coriolis measuring tube 1, only the Coriolis measuring tube 1 itself will be subjected to excitation and Coriolis oscillations while the connecting pipes 2 are exposed to virtually no such oscillations. The "soft"-mounting of the connecting pipes 2 will cause an oscillation of the assembly composed of the Coriolis measuring tube 1 and the compensating cylinder 5 along with the oscillator 3 and the measuring sensor 4 relative to the pipeline system in which the mass flowmeter is installed, in which case the resonant frequency of this oscillation is substantially lower than the natural frequency of the Coriolis measuring tube 1. This substantially reduces the coupling effect of the assembly composed of the Coriolis measuring tube 1, the compensating cylinder 5, the oscillator 3 and the measuring sensor 4 relative to its surroundings.

Figure 2:
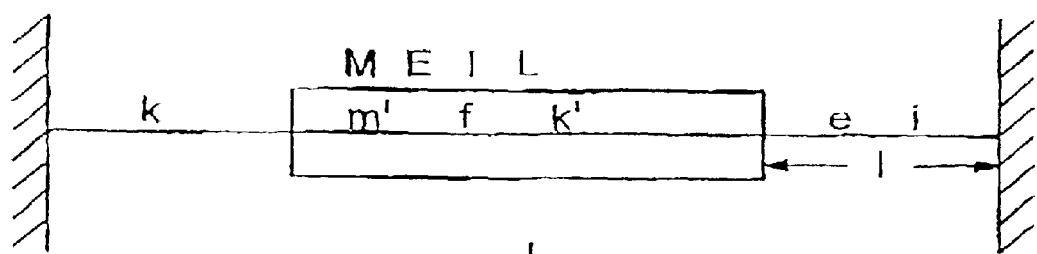
FIG. 2 is a schematic view of the preferred embodiment of a mass flowmeter according to the invention, showing its key parameters.

FIG. 2 is a schematic representation of the parameters of the mass flowmeter according to the first preferred embodiment of the invention.

Figure 3:
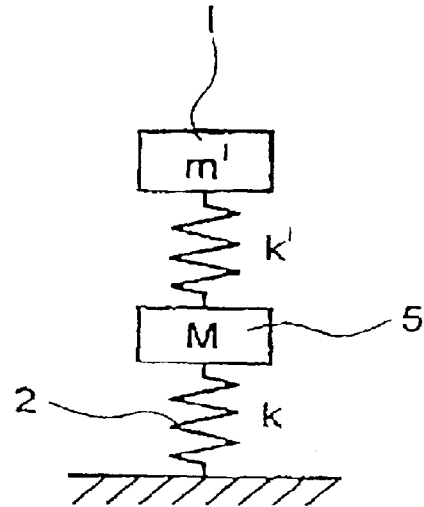
FIG. 3 is a diagrammatic view of the oscillatory coupling of the mass flowmeter according to the preferred embodiment of the invention.

FIG. 3 illustrates in schematic form the oscillatory coupling of the mass flow-meter according to the preferred embodiment of the invention, showing on one side the coupling of the oscillating Coriolis measuring tube 1 to the compensating cylinder 5 and, on the other side, the coupling of the assembly composed of the Coriolis measuring tube 1 and the compensating cylinder 5 to its surroundings, that being the pipeline system in which the mass flowmeter is installed. In view of their negligible mass the oscillator 3 and the measuring sensors 4 are insignificant for the purpose considered.

In the schematic example illustrated in FIG. 3, k represents the spring rate or constant of the connecting pipes 2, k' is the spring constant of the Coriolis measuring tube 1, m' represents the mass of the Coriolis measuring tube 1 and M, as above, is the mass of the compensating cylinder 5. The invention ensures that the spring constant of the Coriolis measuring tube 1 is far higher than the spring constant of the connecting pipes 2 and, at the same time, that the mass of the Coriolis measuring tube 1 is far smaller than the mass of the compensating cylinder 5. As a result, the oscillations of the mass m' of the Coriolis measuring tube 1 in the direction of the mass M of the compensating cylinder 5 via the connecting pipes 2, having that low spring constant k, are virtually prevented from being scattered into the surrounding environment. This constitutes an oscillatory decoupling.

What is claimed is:

1. A mass flowmeter operating by the Coriolis principle and incorporating an essentially straight Coriolis measuring tube through which flows a process medium, two essentially straight connecting pipes conducting the flowing medium, at least one oscillator associated with the Coriolis measuring tube and stimulating said Coriolis measuring tube, at least one measuring sensor associated with the Coriolis measuring tube and capturing Coriolis forces and/or Coriolis oscillations generated by Coriolis forces, and a compensating cylinder, where said Coriolis measuring tube is positioned within the compensating cylinder, the two end sections of the compensating cylinder are solidly connected to the respective end sections of the Coriolis measuring tube, the Coriolis measuring tube transitions with either end section into a connecting pipe, said connecting pipes extend outside the compensating cylinder, and by means of mounting flanges provided on the external ends of the connecting pipes the mass flowmeter can be installed in a pipeline system, wherein each connecting pipe meets the requirements of the formula $$\frac{Mf^2}{ei/l^3} > 5.5$$

where M is the mass of the compensation cylinder, f is the natural frequency of the water-filled Coriolis measuring tube, e is the modulus of elasticity of the connecting pipes, i is the geometric moment of inertia of the connecting pipes and l is the length of the connecting pipes.

2. The mass flowmeter defined in claim 1, wherein each connecting pipe meets the requirements of the formula $$\frac{EI/L^3}{ei/l^3} > 12$$

where E is the modulus of elasticity of the compensating cylinder, I is the geometric moment of inertia of the compensating cylinder and L is the length of the compensating cylinder.

3. The mass flowmeter defined in claim 1 or 2, wherein the flowmeter incorporates a housing that encloses the Coriolis measuring tube, the compensating cylinder and the connecting pipes and is mechanically and solidly attached to the outside end sections of the connecting pipes.

4. The mass flowmeter defined in claim 3, wherein no connection is provided between the compensating cylinder and the housing.

5. The mass flowmeter defined in claim 1 or 2, wherein the inner diameter, the wall thickness and the material of the Coriolis measuring tube match the inner diameter, the wall thickness and the material of the connecting pipes.

6. The mass flowmeter defined in claim 1 or 2, wherein the mounting provisions on the outside end sections of the connecting pipes by means of which the mass flowmeter can be installed in the pipeline system, are in the form of flanges.

* * * * *